United States Patent
Liang

(10) Patent No.: US 11,388,224 B2
(45) Date of Patent: *Jul. 12, 2022

(54) METHOD FOR MANAGING USER INFORMATION OF APPLICATION, DEVICE, AND SYSTEM

(71) Applicant: HUAWEI TECHNOLOGIES CO., LTD., Guangdong (CN)

(72) Inventor: Ming Liang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,531

(22) Filed: Mar. 23, 2021

(65) Prior Publication Data

US 2021/0211488 A1 Jul. 8, 2021

Related U.S. Application Data

(63) Continuation of application No. 15/837,483, filed on Dec. 11, 2017, now Pat. No. 10,986,166, which is a
(Continued)

(30) Foreign Application Priority Data

Jun. 12, 2015 (CN) .......................... 201510323682.4

(51) Int. Cl.
*H04L 67/10* (2022.01)
*H04L 65/40* (2022.01)
(Continued)

(52) U.S. Cl.
CPC .............. *H04L 67/10* (2013.01); *H04L 29/08* (2013.01); *H04L 63/08* (2013.01); *H04L 41/0246* (2013.01); *H04L 67/306* (2013.01)

(58) Field of Classification Search
CPC ......... H04L 67/10; H04L 29/08; H04L 63/08; H04L 41/0246; H04L 67/306
See application file for complete search history.

(56) References Cited

U.S. PATENT DOCUMENTS 8,341,625 B2 12/2012 Ferris et al.
2005/0262512 A1* 11/2005 Schmidt .................. G06F 9/465
719/310
(Continued)

FOREIGN PATENT DOCUMENTS

CN 1635738 7/2005
CN 1780264 5/2006
(Continued)

OTHER PUBLICATIONS

Chinese Office Action dated Sep. 14, 2017 in corresponding Chinese Patent Application 201510323682.4, 5 pages.
(Continued)

*Primary Examiner* — Richard G Keehn
*Assistant Examiner* — Hassan A Khan
(74) *Attorney, Agent, or Firm* — Fish & Richardson P.C.

(57) ABSTRACT

Example methods and apparatus for managing user information of an application are described. One example method is applied to a user management device of a cloud platform, where the cloud platform is configured to bear an application registered by a user with the cloud platform. The method includes receiving a user management registration request of a first application, where the first application is one of applications registered with the cloud platform, and the user management registration request of the first application carries an identifier of the first application. A user management instance is created for the first application according to the user management registration request and the identifier of the first application, where the user management instance is used to manage user information of the first application.

(Continued)

The user management instance is invoked to process a service that is in the first application and related to the user information.

12 Claims, 12 Drawing Sheets

Related U.S. Application Data continuation of application No. PCT/CN2016/071332, filed on Jan. 19, 2016.

(51) Int. Cl.
*H04L 9/40* (2022.01)
*H04L 41/0246* (2022.01)
*H04L 67/306* (2022.01)

(56) References Cited

U.S. PATENT DOCUMENTS

| | | | | |
|---|---|---|---|---|
| 2008/0140827 | A1* | 6/2008 | Ma | H04L 67/22 709/224 |
| 2009/0292927 | A1* | 11/2009 | Wenzel | H04L 63/0815 726/8 |
| 2009/0300607 | A1* | 12/2009 | Ferris | G06F 9/45558 718/1 |
| 2012/0011518 | A1* | 1/2012 | Duan | G06F 9/5061 718/104 |
| 2012/0066020 | A1* | 3/2012 | Moon | G06Q 10/0635 705/7.28 |
| 2012/0260259 | A1* | 10/2012 | Parthasarathy | G06F 9/5005 718/104 |
| 2012/0291114 | A1* | 11/2012 | Poliashenko | G06F 21/44 726/8 |
| 2013/0086669 | A1* | 4/2013 | Sondhi | H04W 12/068 726/8 |
| 2013/0205031 | A1* | 8/2013 | Dorn | G06F 9/5072 709/227 |
| 2013/0282906 | A1* | 10/2013 | An | H04L 41/04 709/226 |
| 2014/0096205 | A1* | 4/2014 | Zhuang | H04L 63/10 726/4 |
| 2014/0215452 | A1* | 7/2014 | Hicks | G06F 8/656 717/172 |
| 2014/0289829 | A1* | 9/2014 | Xu | G06F 21/45 726/6 |
| 2015/0007169 | A1* | 1/2015 | Li | G06F 8/70 717/176 |
| 2015/0020063 | A1* | 1/2015 | Li | G06F 8/61 717/176 |
| 2015/0288747 | A1* | 10/2015 | Olenick | G06F 9/54 709/203 |
| 2015/0327072 | A1* | 11/2015 | Powell | G06Q 20/40 455/411 |
| 2015/0358331 | A1* | 12/2015 | Rachalwar | G06F 21/629 726/7 |

FOREIGN PATENT DOCUMENTS

| | | |
|---|---|---|
| CN | 102195956 | 9/2011 |
| CN | 102236554 | 11/2011 |
| CN | 102427481 | 4/2012 |
| CN | 102611705 | 7/2012 |
| CN | 102821085 | 12/2012 |
| CN | 103002034 | 3/2013 |
| CN | 103259663 | 8/2013 |
| CN | 104253831 | 12/2014 |
| CN | 104539708 | 4/2015 |
| CN | 104601666 | 5/2015 |
| CN | 104954463 | 9/2015 |

OTHER PUBLICATIONS

International Search Report dated Mar. 24, 2016 in corresponding International Patent Application No. PCT/CN2016/071332, 3 pages.
Office Action issued in Chinese Application No. 201810424378.2 dated Jun. 18, 2020, 12 pages (With English Translation).
Written Opinion of the International Search Authority dated Mar. 24, 2016 in corresponding International Patent Application No. PCT/CN2016/071332, 4 pages.

* cited by examiner

US 11,388,224 B2

METHOD FOR MANAGING USER INFORMATION OF APPLICATION, DEVICE, AND SYSTEM

CROSS-REFERENCE TO RELATED APPLICATIONS

This application is a continuation of U.S. patent application Ser. No. 15/837,483, filed on Nov. 12, 2017, which is a continuation of International Application No. PCT/CN2016/071332, filed on Jan. 19, 2016, which claims priority to Chinese Patent Application No. 201510323682.4, filed on Jun. 12, 2015. All of the afore-mentioned patent applications are hereby incorporated by reference in their entireties.

TECHNICAL FIELD

The present invention relates to the field of computer technologies, and in particular, to a method for managing user information of an application, a device, and a system.

BACKGROUND

In the cloud computing era, a mode in which a server platform or a development environment is provided for a user as a service is referred to as a platform-as-a-service (PaaS). Emergence of the PaaS may accelerate development of an application because the PaaS can provide a middleware platform for an enterprise customized research and development and provide a database, an application server, and the like. The PaaS may increase a quantity of resources used on a Web platform. Based on the PaaS platform, a user may quickly develop an application required by the user.

In the prior art, when an application developer develops an application based on the PaaS platform, for an application that needs a user management function, the developer needs to personally develop a user management module, which is configured to implement the user management function of the application. However, basic user management functions required by applications are the same, including "user", "role", "permission", "session", and the like. Therefore, the user management functions are repeatedly developed, which prolongs development periods of the applications.

SUMMARY

Embodiments of the present invention provide a method for managing user information of an application, so that a problem in the prior art that an application developer needs to repeatedly develop a user information management module of the application is resolved, and a development period of the application is shortened. The embodiments of the present invention further provide a corresponding apparatus and system.

A first aspect of the present invention provides a method for managing user information of an application, where the method is applied to a user management device of a cloud platform, the cloud platform is configured to bear an application registered by a user with the cloud platform, and the method includes:

receiving a user management registration request of a first application, where the first application is one of applications registered with the cloud platform, and the user management registration request of the first application carries an identifier of the first application;

creating a user management instance for the first application according to the user management registration request and the identifier of the first application, where the user management instance is used to manage user information of the first application; and invoking the user management instance to process a service that is in the first application and related to the user information.

With reference to the first aspect, in a first possible implementation manner, the creating a user management instance for the first application according to the user management registration request and the identifier of the first application includes:

generating a user management instance according to the user management registration request and a user management instance template; and establishing a correspondence between the identifier of the first application and the generated user management instance to obtain the user management instance of the first application.

With reference to the first aspect or the first possible implementation manner of the first aspect, in a second possible implementation manner, the invoking the user management instance to process a service that is in the first application and related to the user information includes:

invoking the user management instance to receive a user information access request sent by user equipment that runs the first application, where the user information access request carries authentication information; and performing authentication according to the authentication information, after the authentication succeeds, obtaining, from a user information database maintained by the user management instance, user information requested by the first application, and returning, to the user equipment, the user information requested by the first application.

With reference to the first aspect or the first possible implementation manner of the first aspect, in a third possible implementation manner, the invoking the user management instance to process a service that is in the first application and related to the user information includes:

invoking the user management instance to receive a user management extension request sent by a network management device, where the user management extension request carries extension information, and the extension information is functional information that is newly added for the first application, and establishing an association between the extension information and the user information maintained by the user management instance, so that the user management instance accesses the extension information, and sending an extension success response message to the network management device.

With reference to the first aspect or the first possible implementation manner of the first aspect, in a fourth possible implementation manner, the invoking the user management instance to process a service that is in the first application and related to the user information includes:

invoking the user management instance to receive an access request that is of a second application and sent by a network management device, where the access request of the second application carries authentication information of the first application; and performing authentication according to the authentication information, and after the authentication succeeds, providing the user information of the first application for the second application.

With reference to the fourth possible implementation manner of the first aspect, in a fifth possible implementation manner, the providing the user information of the first application for the second application includes:

configuring authentication information of the second application for the second application, and sending the authentication information of the second application to the network management device, so that the network management device configures the authentication information of the second application for the second application, where the authentication information of the second application is used when the second application accesses the user management instance.

With reference to the first aspect and the first to the fifth possible implementation manners of the first aspect, in a sixth possible implementation manner, after the creating a user management instance for the first application according to the user management registration request and the identifier of the first application, the method further includes:

invoking the user management instance to receive registration requests sent by different user equipment for registering the first application, where the registration requests for registering the first application carry user information; and creating a user information database and adding the user information into the database.

A second aspect of the present invention provides a user management device, where the user management device is applied to a cloud platform, the cloud platform is configured to bear an application registered by a user with the cloud platform, and the user management device includes:

a receiving module, configured to receive a user management registration request of a first application, where the first application is one of applications registered with the cloud platform, and the user management registration request of the first application carries an identifier of the first application;

a creating module, configured to create a user management instance for the first application according to the user management registration request received by the receiving module and the identifier of the first application, where the user management instance is used to manage user information of the first application; and an invoking module, configured to invoke the user management instance, which is created by the creating module, to process a service that is in the first application and related to the user information.

With reference to the second aspect, in a first possible implementation manner, the creating module includes:

a generating submodule, configured to generate a user management instance according to the user management registration request and a user management instance template; and an establishing submodule, configured to establish a correspondence between the identifier of the first application and the generated user management instance, which is generated by the generating submodule, to obtain the user management instance of the first application.

With reference to the second aspect or the first possible implementation manner of the second aspect, in a second possible implementation manner, the user management instance includes: a first receiving submodule, a first authentication submodule, a first obtaining submodule, and a first sending submodule, where the first receiving submodule is configured to: when being invoked by the invoking module, receive a user information access request sent by user equipment that runs the first application, where the user information access request carries authentication information;

the first authentication submodule is configured to: when being invoked by the invoking module, perform authentication according to the authentication information received by the first receiving submodule;

the first obtaining submodule is configured to: when being invoked by the invoking module, after the authentication performed by the first authentication submodule succeeds, obtain, from a user information database maintained by the user management instance, user information requested by the first application; and the first sending submodule is configured to: when being invoked by the invoking module, return, to the user equipment, the user information that is requested by the first application and obtained by the first obtaining submodule.

With reference to the second aspect or the first possible implementation manner of the second aspect, in a third possible implementation manner, the user management instance includes: a second receiving submodule, an association establishing submodule, and a second sending submodule, where the second receiving submodule is configured to: when being invoked by the invoking module, receive a user management extension request sent by a network management device, where the user management extension request carries extension information, and the extension information is functional information that is newly added for the first application;

the association establishing submodule is configured to: when being invoked by the invoking module, establish an association between the extension information and the user information maintained by the user management instance, so that the user management instance accesses the extension information; and the second sending submodule is configured to: when being invoked by the invoking module, send an extension success response message to the network management device after the association establishing submodule establishes the association.

With reference to the second aspect or the first possible implementation manner of the second aspect, in a fourth possible implementation manner, the user management instance includes: a third receiving submodule, a second authentication submodule, and an information providing submodule, where the third receiving submodule is configured to: when being invoked by the invoking module, receive an access request that is of a second application and sent by a network management device, where the access request of the second application carries authentication information of the first application;

the second authentication submodule is configured to: when being invoked by the invoking module, perform authentication according to the authentication information received by the third receiving submodule; and the information providing submodule is configured to provide the user information of the first application for the second application after the authentication performed by the second authentication submodule succeeds.

With reference to the fourth possible implementation manner of the second aspect, in a fifth possible implementation manner, the information providing submodule includes a configuration submodule and a third sending submodule, where the configuration submodule is configured to configure authentication information of the second application for the second application when being invoked by the invoking module; and the third sending submodule is configured to: when being invoked by the invoking module, send the authentication information of the second application to the network management device, so that the network management device configures the authentication information of the second application for the second application, where the authentication information of the second application is used when the second application accesses the user management instance.

With reference to the second aspect and the first to the fifth possible implementation manners of the second aspect, in a sixth possible implementation manner, the invoking module is further configured to invoke the user management instance to receive registration requests sent by different user equipment for registering the first application, where the registration requests for registering the first application carry user information; and the creating module is further configured to create a user information database and add the user information into the database.

A third aspect of the present invention provides a cloud platform, where the cloud platform is configured to bear an application registered by a user with the cloud platform, the cloud platform includes a user management device, and the user management device is the user management device according to the foregoing second aspect or any possible implementation manner of the second aspect.

According to the method that is for managing user information of an application and provided in the embodiments of the present invention, a user management instance may be created on a cloud platform for each application in which user management needs to be performed, the user management instance is invoked to process a service that is in the application and related to user information, and a developer does not need to develop user information of the application. Compared with the prior art in which each application developer needs to personally develop a user management module, in the method that is for managing user information of an application and provided in the embodiments of the present invention, a user management instance may be created for each application that has a requirement, so as to manage user information of the application, so that repeated development for the user information of the application may be avoided, and a development period of the application is shortened; in addition, for each application, there may be a dedicated user management instance, so that flexibility of user management is enhanced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method for managing user information of an application, which may avoid repeated development of the user information of the application and shorten a development period of the application; in addition, for each application, there may be a dedicated user management instance, so that flexibility of user management is enhanced. The embodiments of the present invention further provide a corresponding apparatus and system. Details are described in the following separately.

To make a person skilled in the art understand the technical solutions in the present invention better, the following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
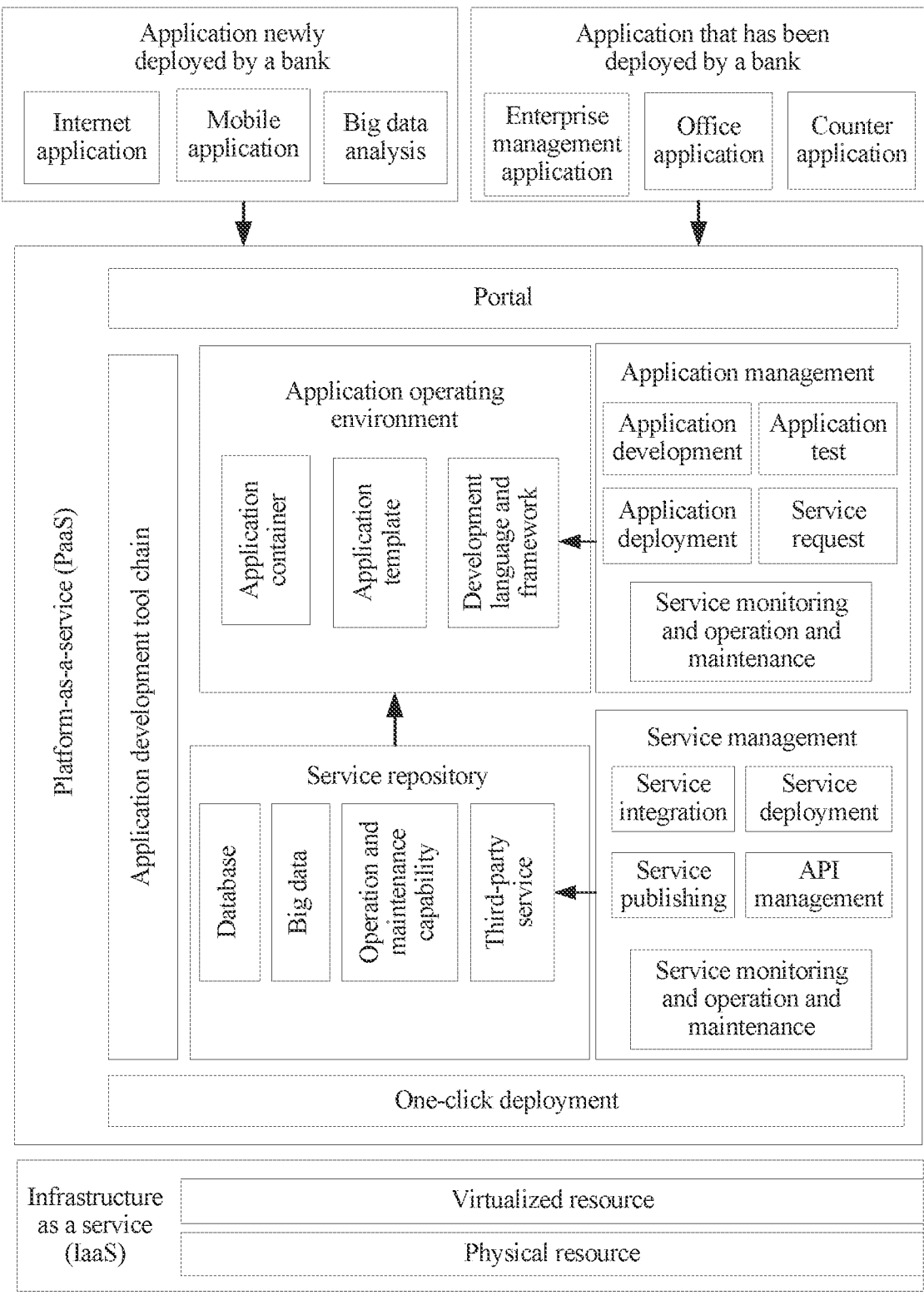
FIG. 1 is a schematic diagram of an embodiment of a cloud platform according to an embodiment of the present invention.

From a perspective of a hardware resource, a cloud platform provided in the embodiments of the present invention may be a server cluster. A virtual machine is configured on a server to implement bearing and management of an application. Therefore, a user management device in the embodiments of the present invention may be a virtual machine on the cloud platform, or may certainly be an independent physical host. According to logical levels, the cloud platform may be divided into an infrastructure as a service (IaaS) layer, a platform-as-a-service (PaaS) layer, and an application layer, which are commonly referred to as an I layer, a P layer, and an application layer. As shown in FIG. 1, the I layer includes a physical resource and a virtualized resource. The P layer includes a portal, an application development tool chain, an application running environment, application management, service management, a service repository, one-click deployment, and the like. The application layer includes multiple applications. FIG. 1 uses a bank application as an example, where the bank application includes an application that is newly deployed by a bank and an application that has been deployed by the bank. The application that is newly deployed by the bank includes an Internet application, a mobile application, and big data analysis, and the application that has been deployed by the bank includes an enterprise management application, an office application, and a counter application. Certainly, these applications are only used as examples herein, actually, many other applications are further included. In addition, FIG. 1 only uses a bank system as an example for description. Actually, various applications may be deployed on the cloud platform, and a corresponding management instance may be created on the P layer for management of each application. In multiple embodiments of the method for managing user information of an application according to the present invention, a process of managing the user information of the application is separately described.

Figure 2:
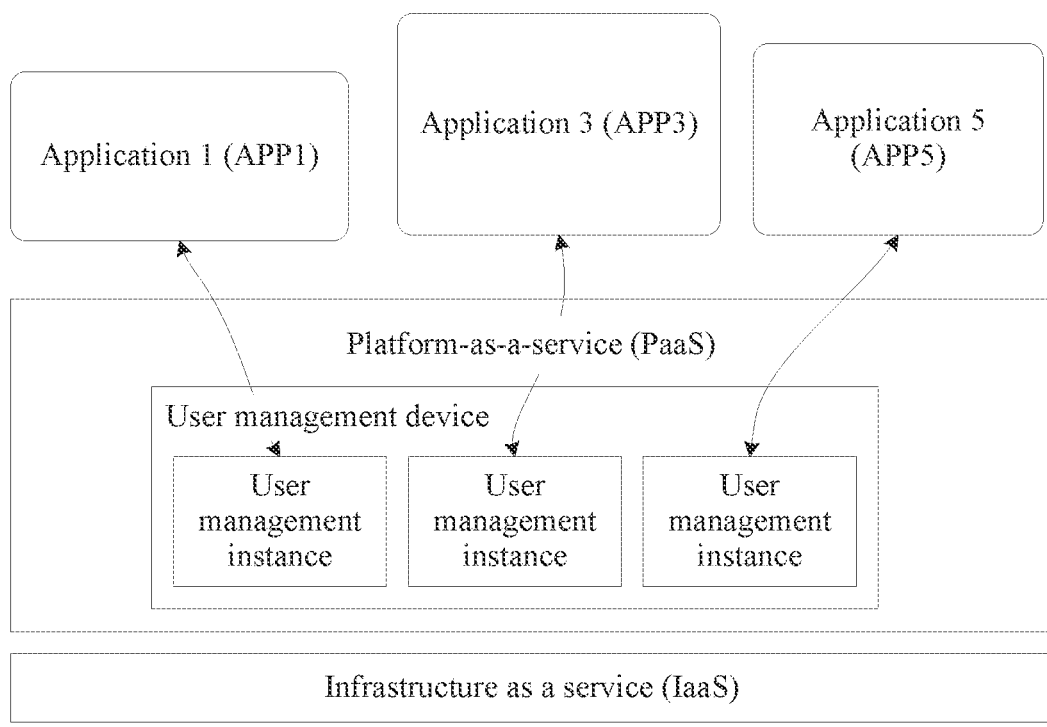
FIG. 2 is a schematic diagram of another embodiment of a cloud platform according to an embodiment of the present invention.

As shown in FIG. 2, an embodiment of the method for managing user information of an application according to an embodiment of the present invention includes:

In this embodiment of the present invention, multiple applications may be registered with a PaaS. For an application that has a user management requirement, a user management device may create a user management instance for each application that has a user management requirement. For example, in FIG. 2, an application 1, an application 3, and an application 5 each has its own user management instance. Creation of the user management instance may be triggered by an application developer. For example, the developer triggers a user management registration request of the application 1 by using a network management device, where the user management registration request carries an identifier of the application, so that the user management device may create the user management instance of the application 1 for the application 1 according to the user management registration request and the identifier of the application 1, and the user management instance of the application 1 is configured to manage user information of the application 1. For a service that is of the application 1 and related to the user information, the user management device may invoke the user management instance of the application 1 to process the service.

In this way, compared with the prior art in which each application developer needs to personally develop a user management module, in the method that is for managing user information of an application and provided in this embodiment of the present invention, a user management instance may be created for each application that has a requirement, so as to manage user information of the application, so that repeated development for the user information of the application may be avoided, and a development period of the application is shortened; in addition, for each application, there may be a dedicated user management instance, so that flexibility of user management is enhanced.

Figure 3:
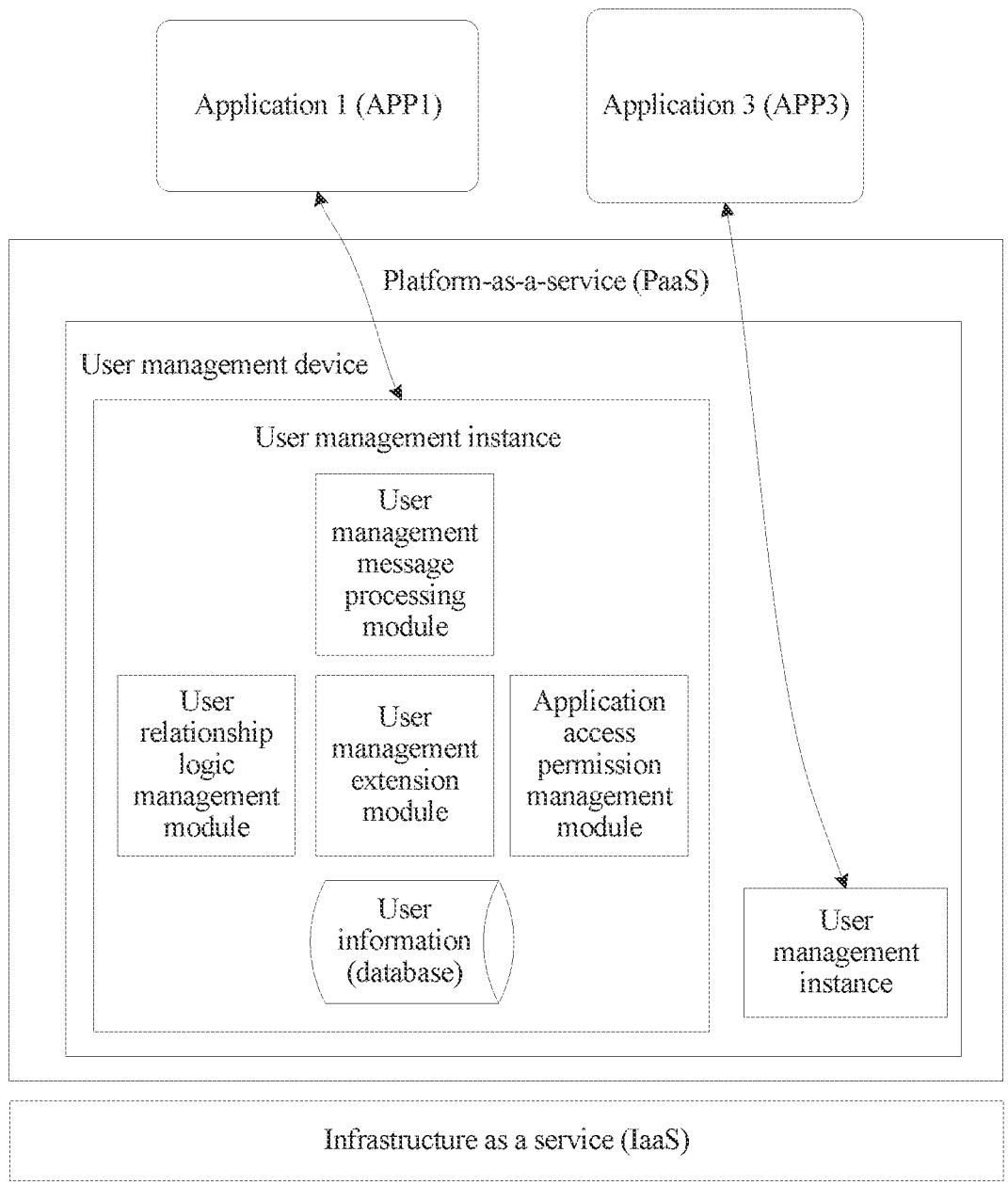
FIG. 3 is a schematic diagram of another embodiment of a cloud platform according to an embodiment of the present invention.

As shown in FIG. 3, the user management instance of the application 1 is used as an example, and each user management instance may have the following modules: a user management message processing module, a user relationship logic management module, an application access permission management module, a user management extension module, and a database module. The following is description of functions of these modules.

The user management message processing module is configured to receive and process a message, and forward the message to another module in the user management instance.

The user relationship logic management module is configured to implement a most basic user management function, including logic management of information such as "user", "role", "permission", and "session", and is responsible for interacting with a database.

The application access permission management module is configured to authenticate whether an application that uses the user information has permission for access, so as to protect security of the user information.

The user management extension module extends a user management capability by adjusting a user logical relationship and the database.

The database is configured to store the user information.

An APP1, an APP3, and an APP5 may be understood as APP clients installed in user equipment.

Figure 4:
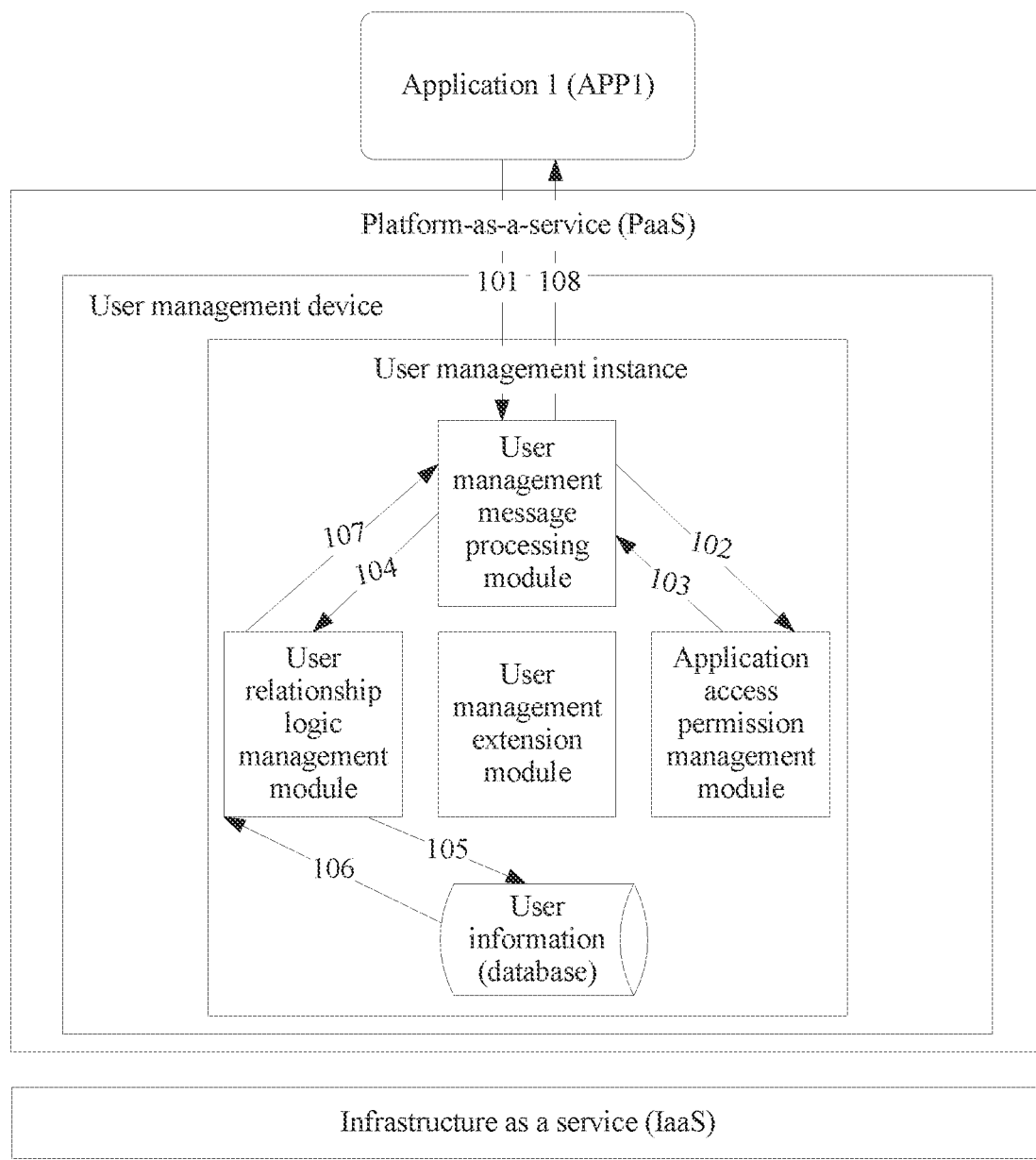
FIG. 4 is a schematic diagram of another embodiment of a cloud platform according to an embodiment of the present invention.

As shown in FIG. 4, an embodiment of the method for managing user information of an application according to this embodiment includes:

101. A user management message processing module receives a user information access request of an APP1, where the user information access request carries authentication information.

The APP1 may be a client installed in user equipment. The authentication information may be an identifier of an APP, or may be an authentication key of an APP.

102. The user management message processing module sends the user information access request to an application access permission management module.

103. The application access permission management module performs application access authentication on the APP1, and after the authentication of the APP1 succeeds, the application access permission management module returns an application authentication success response message to the user management message processing module.

104. After obtaining the authentication success response message, the user management message processing module sends a user information request to a user relationship logic management module.

105. The user relationship logic management module queries a database for user information according to requested content.

106. The database returns corresponding user information.

107. The user relationship logic management module sorts user information data and returns user information required by the App1 to the user management message processing module.

108. The user management message processing module returns the user information to the App1.

A scenario of this embodiment of the present invention may be a scenario of logging in to an APP, such as game login. When a game player logs in to a game in user equipment, after an account and a password are entered, the user equipment sends a user information access request to a user management instance of the game, where the user information access request may carry an identifier of the APP, or may carry an authentication key of the APP. The application access permission management module performs access authentication according to the identifier or the authentication key of the APP. After the authentication succeeds, the user relationship logic management module queries a database for user information of the game APP. After an account and a password of the game APP are obtained from the database by query, the user relationship logic management module performs matching between the password obtained from the database and the account and the password that are sent by the user equipment. After the matching succeeds, the user management message processing module may return a login success response message to the user equipment.

Figure 5:
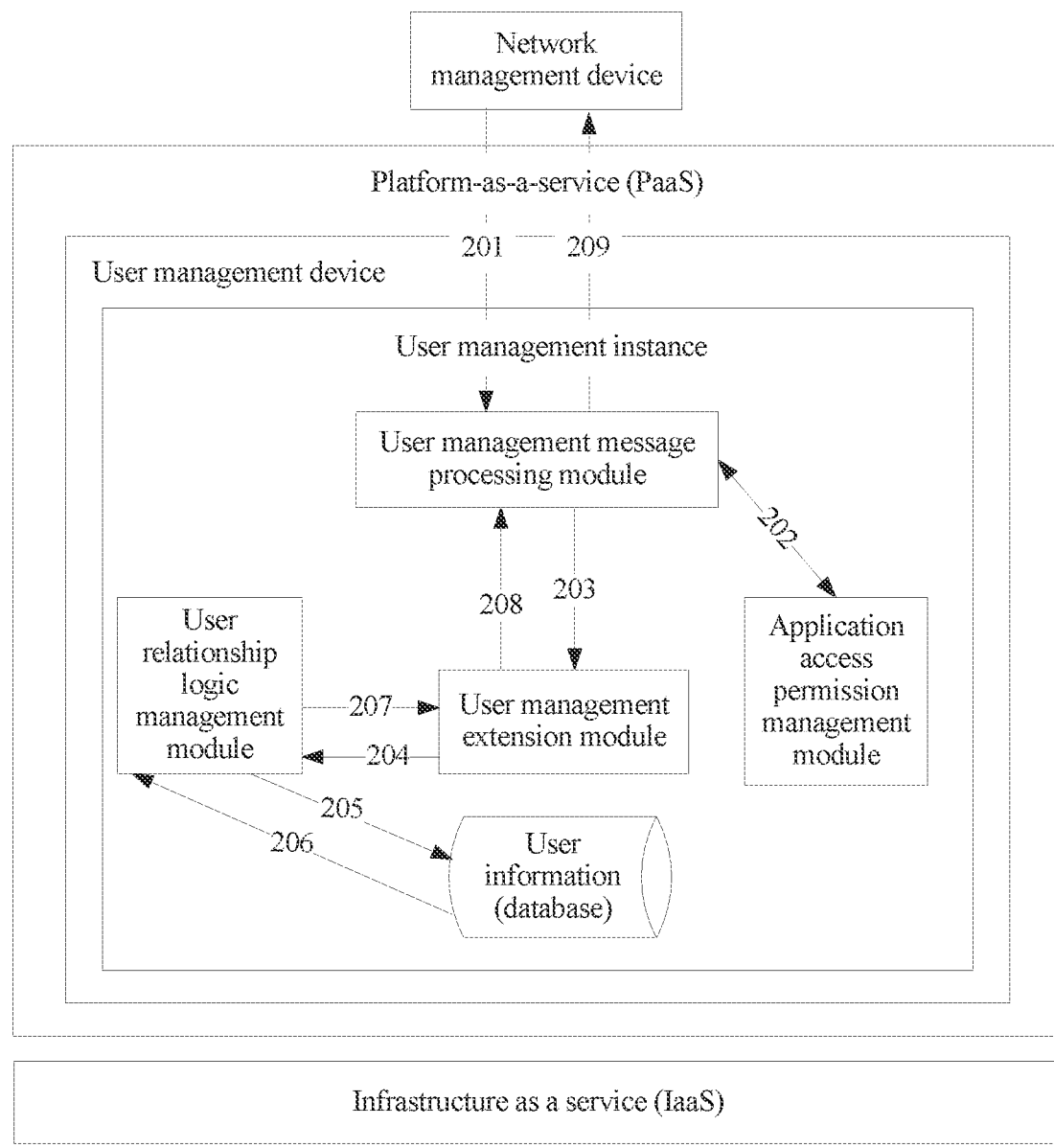
FIG. 5 is a schematic diagram of another embodiment of a cloud platform according to an embodiment of the present invention.

As shown in FIG. 5, another embodiment of the method for managing user information of an application according to this embodiment includes:

This embodiment of the present invention describes a scenario in which user management logic is extended according to an actual need of a user.

After a user management instance is created, a developer may extend user management according to a requirement of the application. For example, a Web application needs to customize a display effect of a page for each user, and configuration information related to the display effect of the user needs to be added into a user management database.

201. A developer sends a user management extension request to a user management message processing module by using a network management device, where the user management extension request carries authentication information and extension information.

For example, the user management extension request may be a request for adding a user information table, where key information such as entry content of the information table that needs to be added and access permission information obtained when an instance is created are carried in the request.

202. The user management message processing module sends an authentication information to an access permission management module to perform access authentication of the application. The application access permission management module performs access authentication according to the authentication information. After the authentication succeeds, an authentication success message is returned to the user management message processing module.

203. The user management message processing module sends a user management extension request to a user management extension module, and after obtaining an authentication success message, the user management message processing module sends, to the user management extension module, extension information that needs to be added.

For example, an information entry that needs to be added is sent to the user management extension module.

204. The user management extension module sends a user management extension command to a user relationship logic management module, transforms the extension information in the user management extension command, and provides the transformed extension information to the user relationship logic management module.

205. The user relationship logic management module adjusts and establishes a user information relationship, and sends a user information table creation request to the database.

206. After successfully storing a user information entry, the database returns a creation success request.

207. The user relationship logic management module returns a user relationship establishment success response to the user management extension module.

208. The user management extension module returns a user information extension success message to the user management message processing module.

209. The user management message processing module sends a user information extension success response to a network management device, and a subsequent application may directly use an added information entry to query a corresponding user information table.

Figure 6:
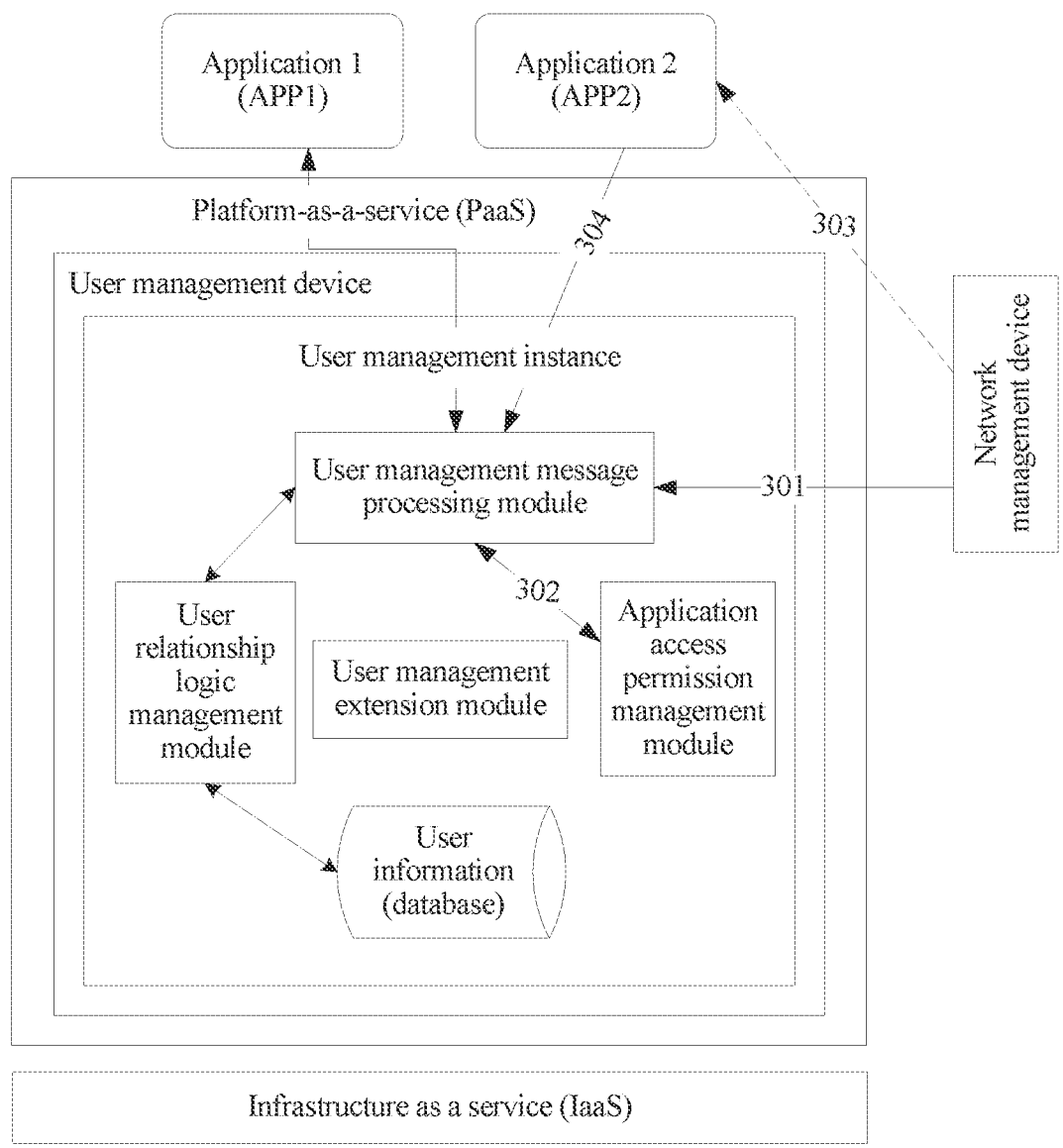
FIG. 6 is a schematic diagram of another embodiment of a cloud platform according to an embodiment of the present invention.

As shown in FIG. 6, another embodiment of the method for managing user information of an application according to this embodiment includes:

Content mainly described in this embodiment is a scenario of how to support different applications to share, by using a user management service, information related to a user.

An advantage of sharing user information is that for applications of a same developer, a user group can be quickly built for a new application.

301. A network management device sends an access request of an APP2 to a user management message processing module, where the access request of the APP2 carries authentication information of an APP1.

302. An application access permission management module performs authentication according to the authentication information of the APP, and after the authentication succeeds, configures authentication information of the APP2 for the APP2.

Authentication is performed according to the authentication information, and after the authentication succeeds, the authentication information of the second application is configured for the second application according to the access request of the second application, and the authentication information of the second application is sent to the network management device, where the authentication information of the second application is used for the second application to use user information maintained by a user management instance of the first application.

303. The network management device notifies the APP2 of key information needed for accessing a user management instance of the APP1, and therefore the APP2 can use the user management instance of the APP1.

304. The APP2 accesses the user management instance of the APP1 by using the key information needed for accessing the user management instance of the APP1.

Figure 7:
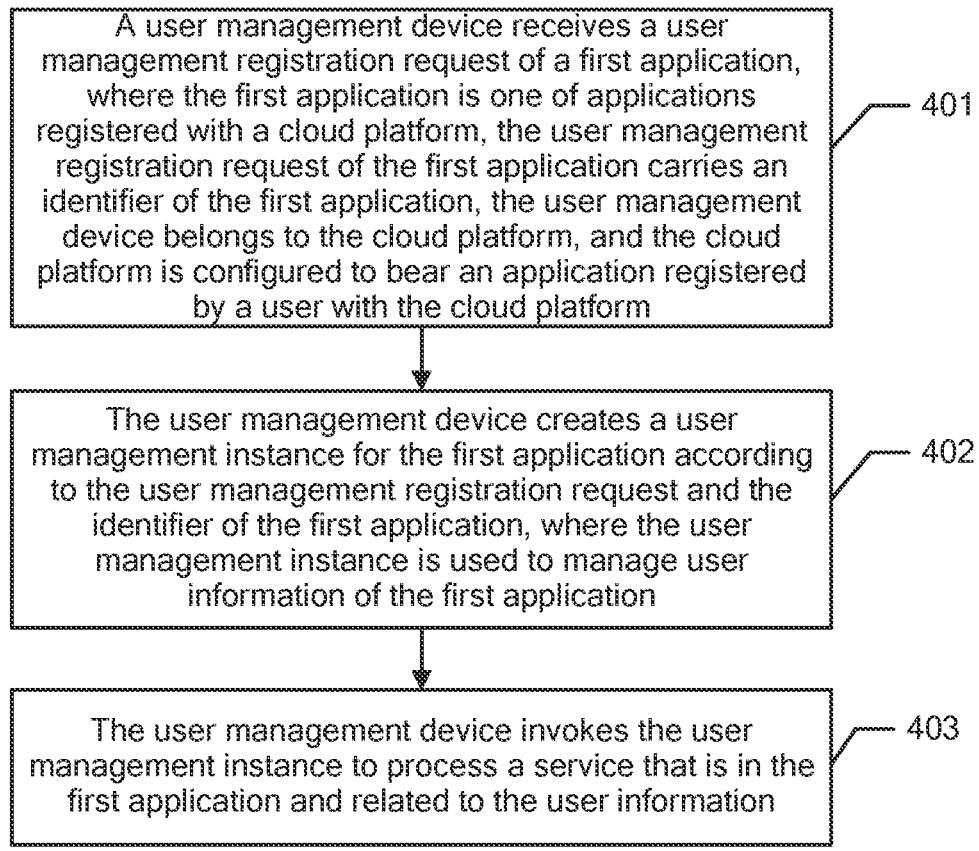
FIG. 7 is a schematic diagram of an embodiment of a method for managing user information of an application according to an embodiment of the present invention.

Referring to FIG. 7, an embodiment of the method for managing user information of an application according to an embodiment of the present invention includes:

401. A user management device receives a user management registration request of a first application, where the first application is one of applications registered with a cloud platform, the user management registration request of the first application carries an identifier of the first application, the user management device belongs to the cloud platform, and the cloud platform is configured to bear an application registered by a user with the cloud platform.

402. The user management device creates a user management instance for the first application according to the user management registration request and the identifier of the first application, where the user management instance is used to manage user information of the first application.

403. The user management device invokes the user management instance to process a service that is in the first application and related to the user information.

The method that is for managing user information of an application and provided in this embodiment of the present invention is applied to a user management device of a cloud platform, where the cloud platform is configured to bear an application registered by a user with the cloud platform. The method includes: receiving a user management registration request of a first application, where the first application is one of applications registered with the cloud platform, and the user management registration request of the first application carries an identifier of the first application; creating a user management instance for the first application according to the user management registration request and the identifier of the first application, where the user management instance is used to manage user information of the first application; and invoking the user management instance to process a service that is in the first application and related to the user information. Compared with the prior art in which each application developer needs to personally develop a user management module, in the method that is for managing user information of an application and provided in this embodiment of the present invention, a user management instance may be created for each application that has a requirement, so as to manage user information of the application, so that repeated development for the user information of the application may be avoided, and a development period of the application is shortened; in addition, for each application, there may be a dedicated user management instance, so that flexibility of user management is enhanced.

Optionally, on the basis of the foregoing embodiment corresponding to FIG. 7, in a first optional embodiment of the method that is for managing user information of an application and provided in an embodiment of the present invention, the creating a user management instance for the first application according to the user management registration request and the identifier of the first application may include:

generating a user management instance according to the user management registration request and a user management instance template; and establishing a correspondence between the identifier of the first application and the generated user management instance to obtain the user management instance of the first application.

In this embodiment of the present invention, creating a user management instance according to a user management instance template accelerates a speed of creating a user management entity.

Optionally, on the basis of the foregoing embodiment corresponding to FIG. 7 or the first optional embodiment, in a second optional embodiment of the method that is for managing user information of an application and provided in an embodiment of the present invention.

the invoking the user management instance to process a service that is in the first application and related to the user information may include:

invoking the user management instance to receive a user information access request sent by user equipment that runs the first application, where the user information access request carries authentication information; and performing authentication according to the authentication information, after the authentication succeeds, obtaining, from a user information database maintained by the user management instance, user information requested by the first application, and returning, to the user equipment, the user information requested by the first application.

This embodiment of the present invention may be understood with reference to description of FIG. 4, and no detailed description is given herein.

Optionally, on the basis of the foregoing embodiment corresponding to FIG. 7 or the first optional embodiment, in a third optional embodiment of the method that is for managing user information of an application and provided in an embodiment of the present invention, the invoking the user management instance to process a service that is in the first application and related to the user information may include:

invoking the user management instance to receive a user management extension request sent by a network management device, where the user management extension request carries extension information, and the extension information is functional information that is newly added for the first application; and establishing an association between the extension information and the user information maintained by the user management instance, so that the user management instance accesses the extension information, and sending an extension success response message to the network management device.

This embodiment of the present invention may be understood with reference to description of FIG. 5, and no detailed description is given herein.

Optionally, on the basis of the foregoing embodiment corresponding to FIG. 7 or the first optional embodiment, in a fourth optional embodiment of the method that is for managing user information of an application and provided in an embodiment of the present invention, the invoking the user management instance to process a service that is in the first application and related to the user information may include:

invoking the user management instance to receive an access request that is of a second application and sent by a network management device, where the access request of the second application carries authentication information of the first application, and performing authentication according to the authentication information, and after the authentication succeeds, providing the user information of the first application for the second application.

Optionally, on the basis of the foregoing fourth optional embodiment corresponding to FIG. 7, in a fifth optional embodiment of the method that is for managing user information of an application and provided in an embodiment of the present invention, the providing the user information of the first application for the second application may include:

configuring authentication information of the second application for the second application, and sending the authentication information of the second application to the network management device, so that the network management device configures the authentication information of the second application for the second application, where the authentication information of the second application is used when the second application accesses the user management instance.

The fourth and the fifth optional embodiments of the present invention may be understood with reference to description of FIG. 6, and no detailed description is given herein.

Optionally, on the basis of the foregoing embodiment corresponding to FIG. 7 or any one of the optional embodiments, in a sixth optional embodiment of the method that is for managing user information of an application and provided in an embodiment of the present invention, after the creating a user management instance for the first application according to the user management registration request and the identifier of the first application, the method may further include:

invoking the user management instance to receive registration requests sent by different user equipment for registering the first application, where the registration requests for registering the first application carry user information; and creating a user information database and adding the user information into the database.

In this embodiment of the present invention, user information may be gradually added into the database when each user performs registration.

Figure 8:
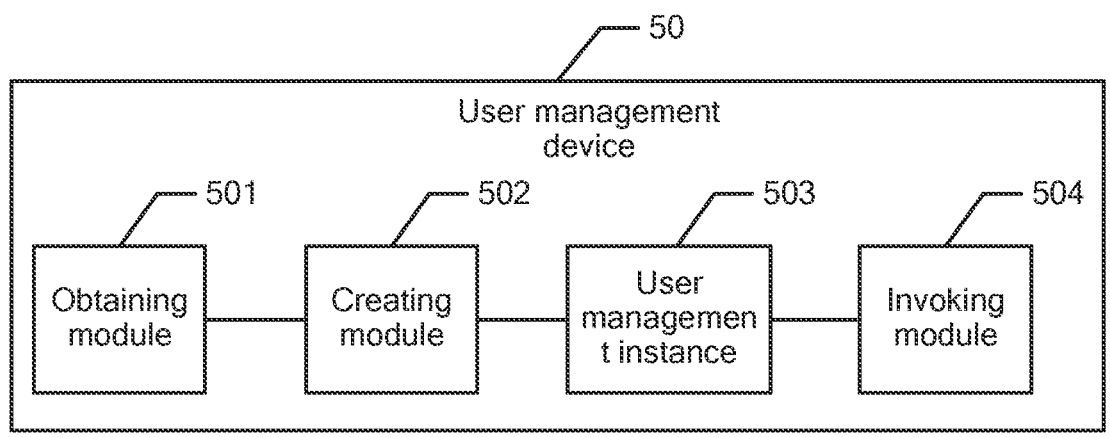
FIG. 8 is a schematic diagram of an embodiment of a user management device according to an embodiment of the present invention.

Referring to FIG. 8, in an embodiment of a user management device 50 provided in an embodiment of the present invention, the user management device 50 is applied to a cloud platform, where the cloud platform is configured to bear an application registered by a user with the cloud platform, and the user management device 50 includes:

a receiving module 501, configured to receive a user management registration request of a first application, where the first application is one of applications registered with the cloud platform, and the user management registration request of the first application carries an identifier of the first application;

a creating module 502, configured to create a user management instance 503 for the first application according to the user management registration request received by the receiving module 501 and the identifier of the first application, where the user management instance of the first application is configured to manage user information of the first application; and an invoking module 504, configured to invoke the user management instance 503, which is created by the creating module 502, to process a service that is in the first application and related to the user information.

The user management device provided in this embodiment of the present invention is applied to a cloud platform where the cloud platform is configured to bear an application registered by a user with the cloud platform. The user management device 50 includes: a receiving module 501, which receives a user management registration request of a first application, where the first application is one of applications registered with the cloud platform, and the user management registration request of the first application carries an identifier of the first application; a creating module 502, which creates a user management instance 503 for the first application according to the user management registration request received by the receiving module 501 and the identifier of the first application, where the user management instance 503 of the first application is configured to manage user information of the first application; and an invoking module 504, which invokes the user management instance 503, which is created by the creating module 502, to process a service that is in the first application and related to the user information. Compared with the prior art in which each application developer needs to personally develop a user management module, according to the user management device provided in this embodiment of the present invention, a user management instance may be created for each application that has a requirement, so that user information of the application is managed, repeated development for the user information of the application may be avoided, and a development period of the application is shortened; in addition, for each application, there may be a dedicated user management instance, so that flexibility of user management is enhanced.

Figure 9:
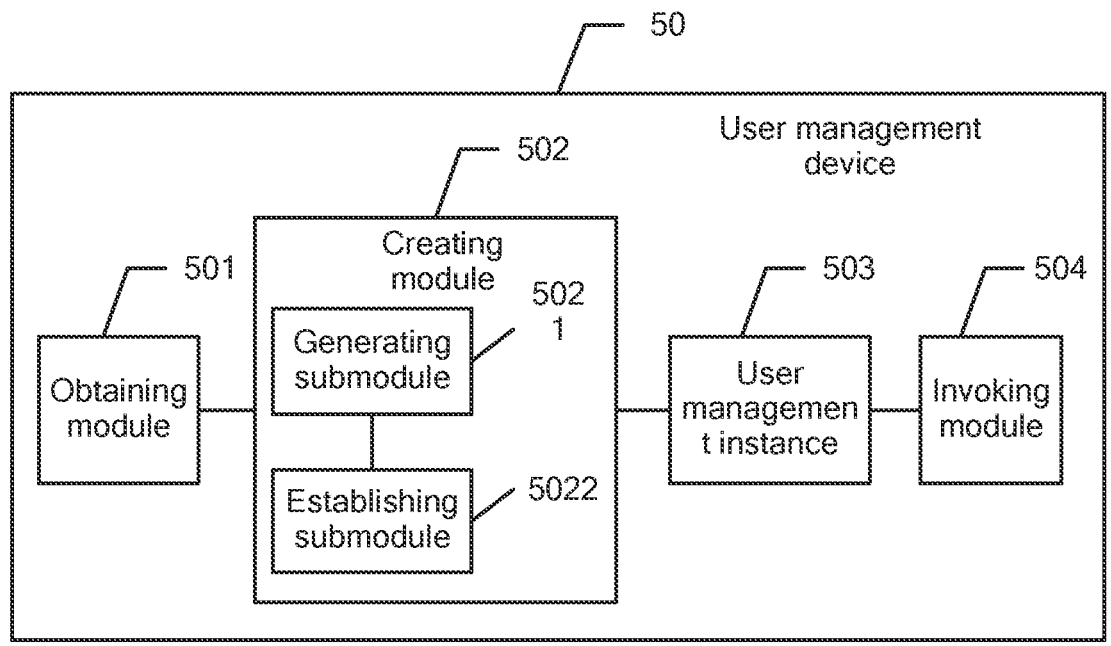
FIG. 9 is a schematic diagram of another embodiment of a user management device according to an embodiment of the present invention.

Optionally, on the basis of the foregoing embodiment corresponding to FIG. 8, referring to FIG. 9, in a first optional embodiment of the user management device 50 provided in an embodiment of the present invention, the creating module 502 includes:

a generating submodule 5021, configured to generate a user management instance according to the user management registration request and a user management instance template; and an establishing submodule 5022, configured to establish a correspondence between the identifier of the first application and the generated user management instance, which is generated by the generating submodule, to obtain the user management instance of the first application.

Figure 10:
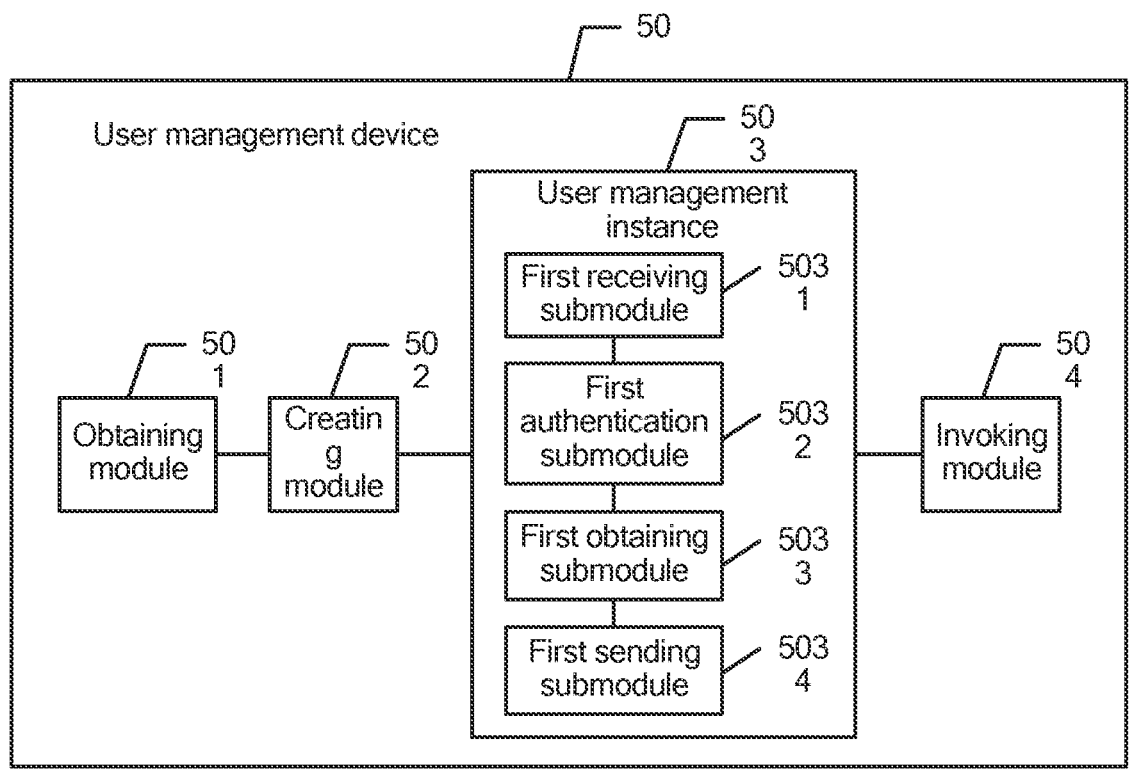
FIG. 10 is a schematic diagram of another embodiment of a user management device according to an embodiment of the present invention.

Optionally, on the basis of the foregoing embodiment corresponding to FIG. 8, referring to FIG. 10, in a second optional embodiment of the user management device 50 provided in an embodiment of the present invention, the user management instance 503 includes: a first receiving submodule 5031, a first authentication submodule 5032, a first obtaining submodule 5033, and a first sending submodule 5034.

The first receiving submodule 5031 is configured to: when being invoked by the invoking module 504, receive a user information access request that is of the first application and sent by user equipment that runs the first application, where the user information access request carries authentication information.

The first authentication submodule 5032 is configured to: when being invoked by the invoking module 504, perform authentication according to the authentication information received by the first receiving submodule 5031.

The first obtaining submodule 5033 is configured to: when being invoked by the invoking module 504, after the authentication performed by the first authentication submodule 5032 succeeds, obtain, from a user information database maintained by the user management instance of the first application, user information requested by the first application.

The first sending submodule 5034 is configured to: when being invoked by the invoking module 504, return, to the user equipment, the user information that is requested by the first application and obtained by the first obtaining submodule 5033.

This embodiment of the present invention may be understood with reference to description of FIG. 4. Though names of modules are different, functions are actually the same, and no detailed description is given herein.

Figure 11:
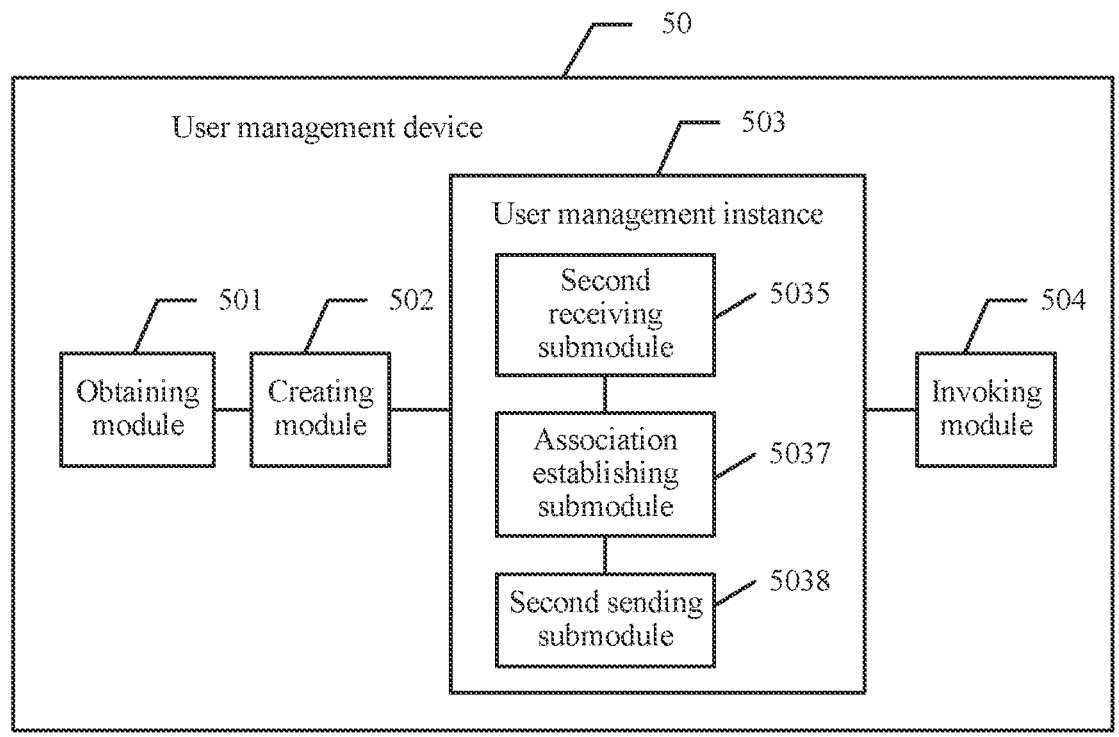
FIG. 11 is a schematic diagram of another embodiment of a user management device according to an embodiment of the present invention.

Optionally, on the basis of the foregoing embodiment corresponding to FIG. 8, referring to FIG. 11, in a third optional embodiment of the user management device 50 provided in an embodiment of the present invention, the user management instance 503 includes: a second receiving submodule 5035, an association establishing submodule 5037, and a second sending submodule 5038.

The second receiving submodule 5035 is configured to: when being invoked by the invoking module 504, receive a user management extension request sent by a network management device, where the user management extension request carries extension information, and the extension information is functional information that is newly added for the first application.

The association establishing submodule 5037 is configured to: when being invoked by the invoking module 504, establish an association between the extension information and the user information maintained by the user management instance, so that the user management instance accesses the extension information.

The second sending submodule 5038 is configured to: when being invoked by the invoking module 504, send an extension success response message to the network management device after the association establishing submodule 5037 establishes the association.

This embodiment of the present invention may be understood with reference to description of FIG. 5. Though names of modules are different, functions are actually the same, and no detailed description is given herein.

Figure 12:
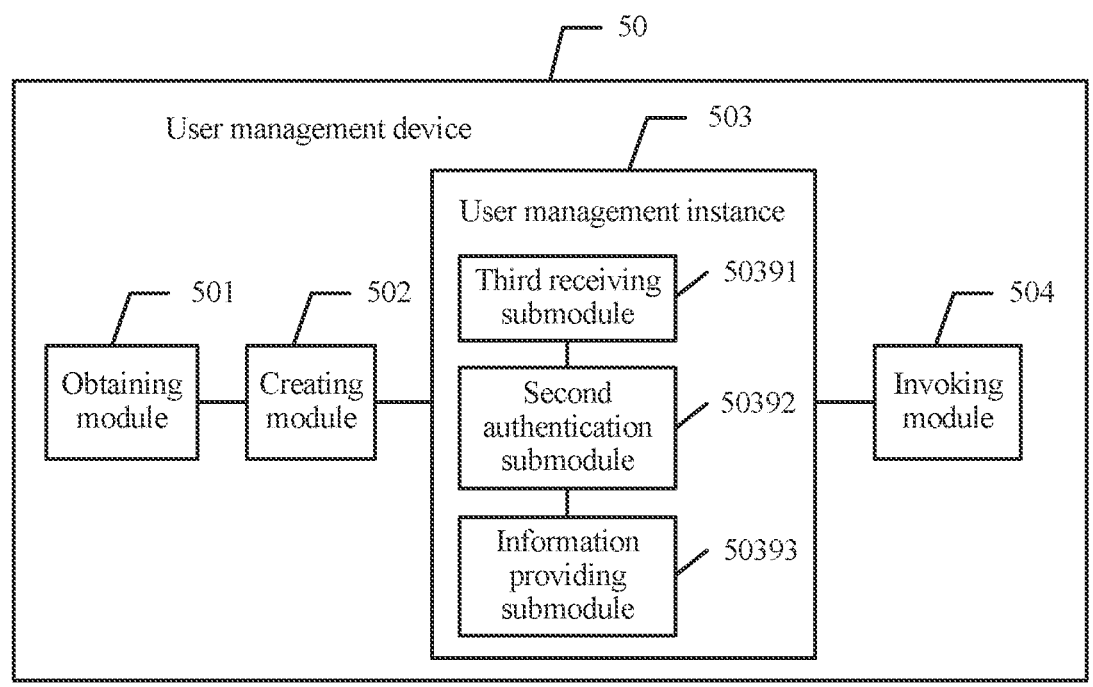
FIG. 12 is a schematic diagram of another embodiment of a user management device according to an embodiment of the present invention.

Optionally, on the basis of the foregoing embodiment corresponding to FIG. 8, referring to FIG. 12, in a fourth optional embodiment of the user management device 50 provided in an embodiment of the present invention, the user management instance 503 includes: a third receiving submodule 50391, a second authentication submodule 50392, and an information providing submodule 50393.

The third receiving submodule 50391 is configured to: when being invoked by the invoking module 504, receive an access request that is of a second application and sent by a network management device, where the access request of the second application carries authentication information of the first application.

The second authentication submodule 50392 is configured to: when being invoked by the invoking module 504, perform authentication according to the authentication information received by the third receiving submodule 50391.

The information providing submodule 50393 is configured to provide the user information of the first application for the second application after the authentication performed by the second authentication submodule 50392 succeeds.

Figure 13:
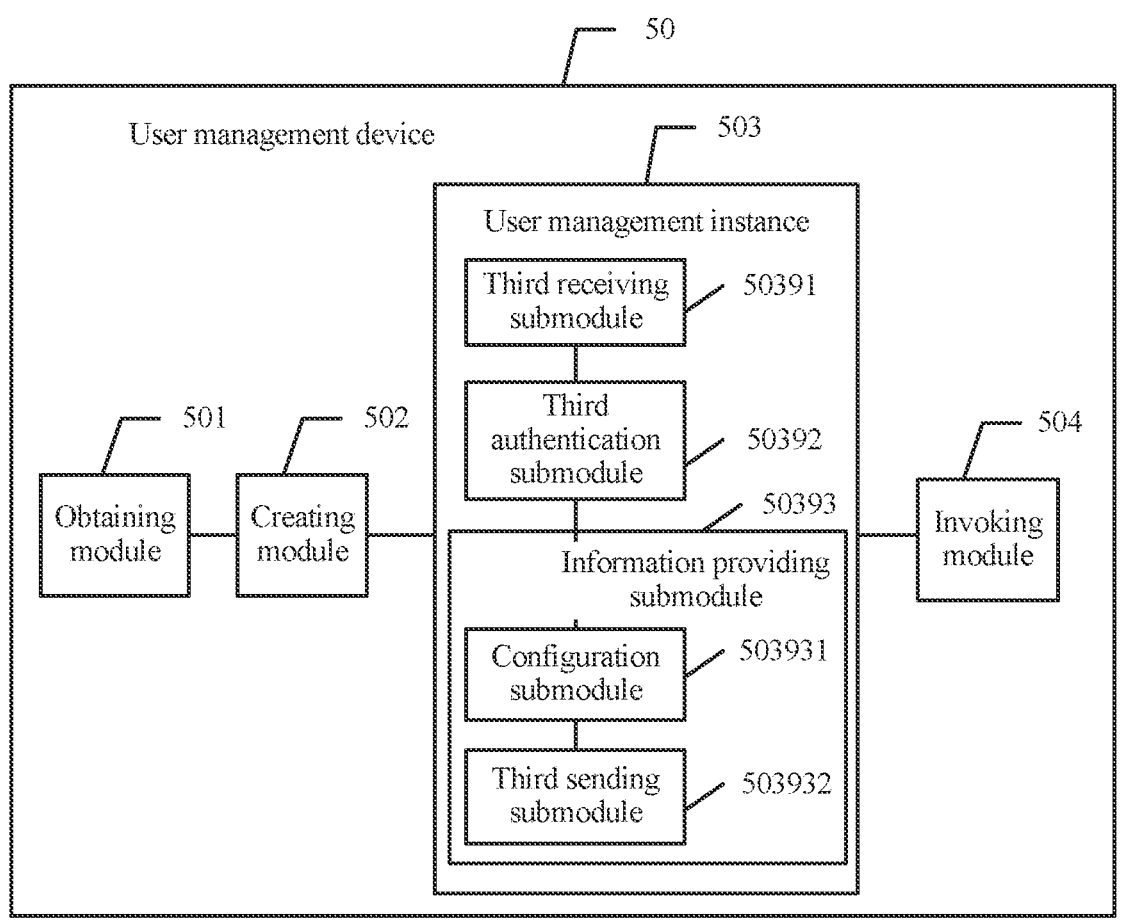
FIG. 13 is a schematic diagram of another embodiment of a user management device according to an embodiment of the present invention.

Optionally, on the basis of the foregoing embodiment corresponding to FIG. 12, referring to FIG. 13, in a fifth optional embodiment of the user management device 50 provided in an embodiment of the present invention, the information providing submodule 50393 includes: a configuration submodule 503931 and a third sending submodule 503932.

The configuration submodule 503931 is configured to configure authentication information of the second application for the second application when being invoked by the invoking module 504.

The third sending submodule 503932 is configured to: when being invoked by the invoking module 504, send the authentication information of the second application to the network management device, so that the network management device configures the authentication information of the second application for the second application, where the authentication information of the second application is used when the second application accesses the user management instance.

This embodiment of the present invention may be understood with reference to description of FIG. 6. Though names of modules are different, functions are actually the same, and no detailed description is given herein.

Optionally, on the basis of the foregoing embodiment corresponding to FIG. 8 or any one of optional embodiments corresponding to FIG. 9 to FIG. 13, in a fourth optional embodiment of the user management device 50 provided in an embodiment of the present invention, the invoking module 504 is further configured to invoke the user management instance to receive registration requests sent by different user equipment for registering the first application, where the registration requests for registering the first application carry user information; and the creating module 502 is further configured to create a user information database and add the user information into the database.

In this embodiment of the present invention, the first receiving submodule, the second receiving submodule, the third receiving submodule, the first sending submodule, the second sending submodule, and the third sending submodule may be the user management message processing module in the embodiments corresponding to FIG. 2 to FIG. 6; the first authentication submodule and the second authentication submodule may be the application access permission management module in the embodiments corresponding to FIG. 2 to FIG. 6; the first obtaining submodule may be the user relationship logic management module in the embodiments corresponding to FIG. 2 to FIG. 6; and the association establishing submodule may be the user management extension module in the embodiments corresponding to FIG. 2 to FIG. 6.

In multiple embodiments of the foregoing user management device, it should be understood that, in one implementation manner, a receiving module, a receiving submodule, and a sending submodule may be implemented by an input/output I/O device (such as a network adapter), and a creating module, an invoking module, an authentication submodule, an association establishing submodule, and a configuration submodule may be implemented by a processor by executing a program or an instruction in a memory (in other words, the creating module, the invoking module, the authentication submodule, the association establishing submodule, and the configuration submodule are implemented by means of mutual cooperation between the processor and a special instruction in a memory coupled with the processor); in another implementation manner, a receiving module, a receiving submodule, and a sending submodule may be implemented by an input/output I/O device (such as a network adapter), and a creating module, an invoking module, an authentication submodule, an association establishing submodule, and a configuration submodule may be separately implemented by using a dedicated circuit, where for a specific implementation manner, refer to the prior art, and details are not described herein again; in still another implementation manner, a receiving module, a receiving submodule, and a sending submodule may be implemented by an input/output I/O device (such as a network adapter), and a creating module, an invoking module, an authentication submodule, an association establishing submodule, and a configuration submodule may be implemented by a field-programmable gate array (FPGA, Field-Programmable Gate Array), where for a specific implementation manner, refer to the prior art, and details are not described herein again. The present invention includes but is not limited to the foregoing implementation manners, and it should be understood that all solutions implemented according to the idea of the present invention shall fall within the protection scope of the embodiments of the present invention.

Figure 14:
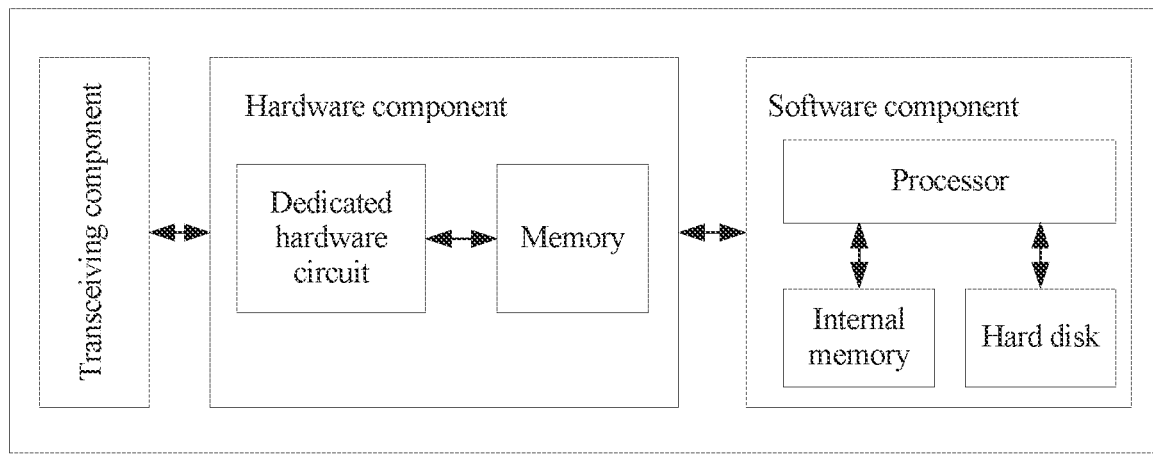
FIG. 14 is a schematic diagram of another embodiment of a user management device according to an embodiment of the present invention.

This embodiment provides a hardware structure of a user management device. Referring to FIG. 14, the hardware structure of the user management device may include:

three parts: a transceiving component, a software component, and a hardware component.

The transceiving component is a hardware circuit that is configured to complete packet transceiving.

The hardware component may also be referred to as a "hardware processing module", or may be more simply referred to as "hardware" for short. The hardware component mainly includes a hardware circuit that implements (probably with cooperation from another auxiliary component such as a memory) some specific functions on the basis of dedicated hardware circuits such as an FPGA and an ASIC. Generally, a processing speed of the hardware component is much faster than that of a general purpose processor. However, a function of the hardware component is hard to change once being customized, and therefore, it is not flexible to implement a function, and the hardware component is generally configured to process some fixed functions. It should be noted that, in an actual application, the hardware component may also include processors such as an MCU (a microprocessor, such as a single-chip microcomputer) or a CPU. However, a main function of these processors is not to complete processing of big data but to perform some control. In such an application scenario, a system form by these components is a hardware component.

The software component (or simply referred to as "software") mainly includes a general purpose processor (such as a CPU) and some auxiliary components (such as storage devices like a memory and a hard disk). The processor may be provided with a corresponding processing function by means of programming. When being implemented by using software, a function may be flexibly configured according to a service requirement, but a speed of the function is slower than that of the hardware component. After data is processed by the software, the hardware component may send processed data by using the transceiving component, or may send the processed data to the transceiving component by using an interface connected to the transceiving component.

In this embodiment, the transceiving component is configured to receive a request in the foregoing embodiment, and the software component or the hardware component is configured to create a user management instance and the like.

Other functions of the hardware component and the software component are described in detail in the foregoing embodiment, and details are not described herein again.

With reference to the accompany drawings, the following gives detailed description of a solution in which a receiving submodule and a sending submodule may be implemented by an input/output I/O device (such as a network adapter), and a creating module, an invoking module, an authentication submodule, an association establishing submodule, and a configuration submodule may be implemented by a processor by executing a program or an instruction in a memory.

Figure 15:
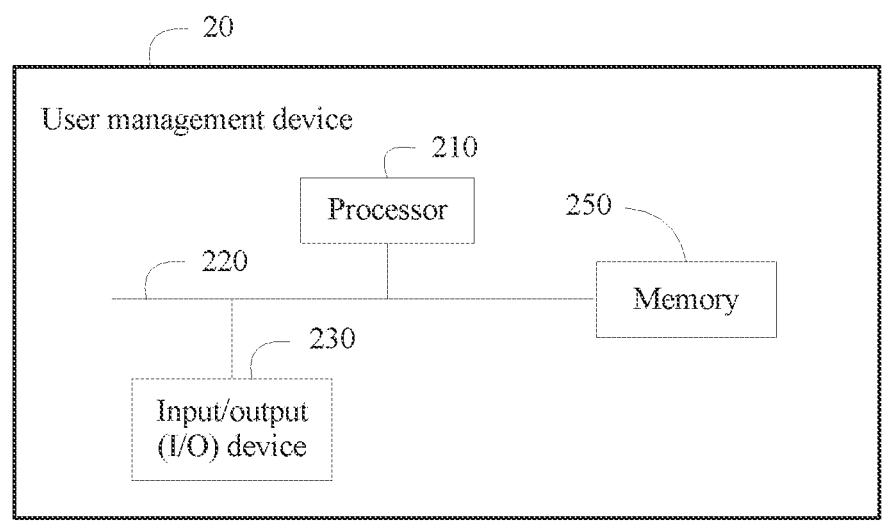
FIG. 15 is a schematic diagram of another embodiment of a user management device according to an embodiment of the present invention.

FIG. 15 is a schematic structural diagram of a user management device 50 according to an embodiment of the present invention. The user management device 50 is applied to a cloud platform, where the cloud platform is configured to bear an application registered by a user with the cloud platform. The user management device 50 includes a processor 510, a memory 550, and an input/output I/O device 530, where the memory 550 may include a read-only memory and a random access memory, and provide an operation instruction and data for the processor 510. A part of the memory 550 may further include a non-volatile random access memory (NVRAM).

In some implementation manners, the memory 550 stores the following elements; executable modules or data structures, or their subsets, or their extended sets.

In this embodiment of the present invention, the operation instruction stored in the memory 550 (the operation instruction may be stored in an operating system) is invoked to:

receive a user management registration request of a first application, where the first application is one of applications registered with the cloud platform, and the user management registration request of the first application carries an identifier of the first application;

create a user management instance for the first application according to the user management registration request and the identifier of the first application, where the user management instance is used to manage user information of the first application; and invoke the user management instance of the first application to process a service that is in the first application and related to the user information.

It can be seen that, compared with the prior art in which each application developer needs to personally develop a user management module, according to the user management device provided in this embodiment of the present invention, a user management instance may be created for each application that has a requirement, so as to manage user information of the application, so that repeated development for the user information of the application may be avoided, and a development period of the application is shortened; in addition, for each application, there may be a dedicated user management instance, so that flexibility of user management is enhanced.

The processor 510 controls an operation of the user management device 50, and the processor 510 may also be referred to as a CPU (Central Processing Unit, central processing unit). The memory 550 may include a read-only memory and a random access memory, and provide an instruction and data for the processor 510. A part of the memory 550 may further include a non-volatile random access memory (NVRAM). In a specific application, all components of the user management device 50 are coupled together by using a bus system 520, where the bus system 520 may further include a power bus, a control bus, a status signal bus, and the like in addition to a data bus. However, for clear description, various types of buses are marked as the bus system 520 in the figure.

The methods disclosed in the foregoing embodiments of the present invention may be applied to the processor 510, or implemented by the processor 510. The processor 510 may be an integrated circuit chip and has a signal processing capability. In an implementation process, the steps in the foregoing methods may be completed by means of an integrated logic circuit of hardware in the processor 510 or an instruction in a form of software. The foregoing processor 510 may be a general purpose processor, a digital signal processor (DSP), an application-specific integrated circuit (ASIC), a field programmable gate array (FPGA) or another programmable logic component, a discrete gate or a transistor logic component, or a discrete hardware component, and may implement or execute methods, steps and logical block diagrams disclosed in the embodiments of the present invention. The general purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 550, and the processor 510 reads information in the memory 550 and completes the steps in the foregoing methods in combination with hardware of the processor.

Optionally, the processor 510 is specifically configured to generate a user management instance according to the user management registration request and a user management instance template, and establish a correspondence between the identifier of the first application and the generated user management instance to obtain the user management instance of the first application.

Optionally, the processor 510 is specifically configured to: invoke the user management instance to receive a user information access request sent by user equipment that runs the first application, where the user information access request carries authentication information; perform authentication according to the authentication information; after the authentication succeeds, obtain, from a user information database maintained by the user management instance, user information requested by the first application; and return, to the user equipment, the user information requested by the first application.

Optionally, the processor 510 is specifically configured to: invoke the user management instance to receive a user management extension request sent by a network management device, where the user management extension request carries extension information, and the extension information is functional information that is newly added for the first application; establish an association between the extension information and the user information maintained by the user management instance, so that the user management instance accesses the extension information; and send an extension success response message to the network management device.

Optionally, the processor 510 is specifically configured to: invoke the user management instance to receive an access request that is of a second application and sent by a network management device, where the access request of the second application carries authentication information of the first application, perform authentication according to the authentication information, and provide the user information of the first application for the second application after the authentication succeeds.

Optionally, the processor 510 is specifically configured to configure authentication information of the second application for the second application, and send the authentication information of the second application to the network management device, so that the network management device configures the authentication information of the second application for the second application, where the authentication information of the second application is used when the second application accesses the user management instance.

Optionally, the processor 510 is further configured to invoke the user management instance to receive registration requests sent by different user equipment for registering the first application, where the registration requests for registering the first application carry user information, create a user information database, and add the user information into the database.

Figure 16:
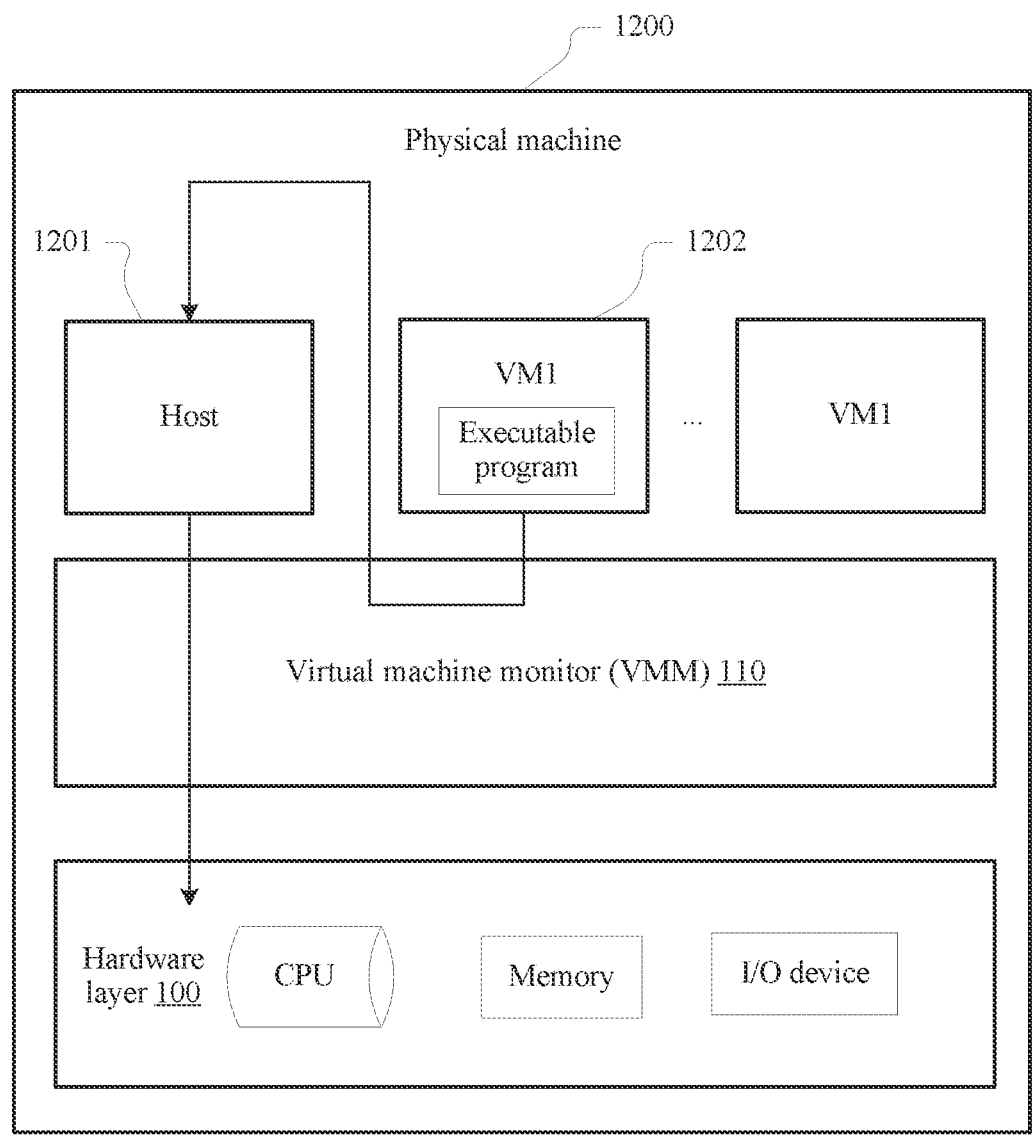
FIG. 16 is a schematic diagram of an embodiment of a physical machine that operates a user management device according to an embodiment of the present invention.

It should be noted that the user management device provided in this embodiment of the present invention may be specifically a cloud host on a cloud platform, where the cloud host may be a virtual machine running on a physical machine. As shown in FIG. 16, a physical machine 1200 includes a hardware layer 100, a VMM (Virtual Machine Monitor, virtual machine monitor) 110 running above the hardware layer 100, and a host Host 1201 and several virtual machines (VM, Virtual Machine) that are running above the VMM 110, where the hardware layer includes but is not limited to an I/O device, a CPU, and a memory. The user management device on the cloud platform according to this embodiment of the present invention may be specifically a virtual machine in the physical machine 1200, for example, a VM 1202. One or more cloud applications are running on the VM 1202, where each cloud application, such as a database application or a map application, is used to implement a corresponding service function, and these applications may be developed by a developer and then deployed in a cloud computing system. In addition, the VM 1202 further runs an executable program. By running the executable program and using the host Host 1201 in a process of running the program, the VM 1202 invokes a hardware resource of the hardware layer 100 to implement functions of a creating module, an invoking module, an authentication submodule, an association establishing submodule, a configuration submodule of the user management device on the cloud platform. Specifically, the creating module, the invoking module, the authentication submodule, the association establishing submodule, and the configuration submodule may be included in the foregoing executable program in a form of a software module or a function, for example, the executable program may include: the creating module, the invoking module, the authentication submodule, the association establishing submodule, and the configuration submodule. The VM 1202 invokes resources such as a CPU and a Memory that are on the hardware layer 100 to run the executable program, so as to implement the functions of the creating module, the invoking module, the authentication submodule, the association establishing submodule, and the configuration submodule.

The embodiment corresponding to FIG. 15 and another optional embodiment may be understood with reference to description of FIG. 1 to FIG. 13, and no detailed description is given herein.

A person of ordinary skill in the art may understand that all or some of the steps of the methods in the embodiments may be implemented by a program instructing relevant hardware (such as a processor). The program may be stored in a computer-readable storage medium. The storage medium may include: a ROM, a RAM, a magnetic disk, an optical disc, or the like.

The foregoing gives detailed description on the method for managing user information of an application, the device, and the system that are provided in the embodiments of the present invention. In this specification, specific examples are used to describe the principle and implementation manners of the present invention, and the description of the embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for managing user information of an application on a cloud platform, wherein the method comprises:

receiving, by the cloud platform, a user management registration request of a first application, wherein the first application is registered with the cloud platform, and wherein the user management registration request of the first application carries an identifier of the first application;

creating, by the cloud platform, a user management instance for managing user information of the first application according to the user management registration request and a user management instance template;

invoking, by the cloud platform, the user management instance to process a service based on the user information of the first application, wherein processing the service based on the user information of the first application comprises:
receiving an access request of a second application, wherein the access request of the second application carries authentication information of the first application; and
performing authentication according to the authentication information carried in the access request of the second application; and
after the authentication succeeds, providing the user information of the first application for the second application.

2. The method according to claim 1, wherein the creating, by the cloud platform, the user management instance for managing user information of the first application according to the user management registration request and the user management instance template comprises:
generating the user management instance according to the user management registration request and the user management instance template; and
establishing a correspondence between the identifier of the first application and the generated user management instance to obtain the user management instance of the first application.

3. The method according to claim 1, wherein the invoking, by the cloud platform, the user management instance to process a service based on the user information of the first application comprises:
invoking the user management instance to receive a user information access request sent by user equipment that runs the first application, wherein the user information access request carries authentication information;
performing authentication according to the authentication information;
after the authentication succeeds, obtaining, from a user information database maintained by the user management instance, user information requested by the first application; and
returning the user information requested by the first application.

4. The method according to claim 1, wherein the invoking, by the cloud platform, the user management instance to process a service based on the user information of the first application comprises:
invoking the user management instance to receive a user management extension request sent by a network management device, wherein the user management extension request carries extension information, and wherein the extension information is functional information that is newly added for the first application;
establishing an association between the extension information and the user information maintained by the user management instance, wherein the user management instance accesses the extension information; and
sending an extension success response message to the network management device.

5. The method according to claim 1, wherein the providing the user information of the first application for the second application comprises:
configuring authentication information of the second application for the second application; and
sending the authentication information of the second application to a network management device, wherein the network management device configures the authentication information of the second application for the second application, and wherein the authentication information of the second application is used when the second application accesses the user management instance.

6. The method according to a claim 1, the method further comprises:
invoking, by the cloud platform, the user management instance to receive registration requests sent by different user equipment for registering the first application, wherein the registration requests for registering the first application carry user information; and
creating a user information database and adding the user information into the user information database.

7. A user management device, comprising:
at least one processor; and
one or more memories coupled to the at least one processor and storing instructions for execution by the at least one processor to:
receive a user management registration request of a first application, wherein the first application is registered with a cloud platform, and wherein the user management registration request of the first application carries an identifier of the first application;
create a user management instance for managing user information of the first application according to the received user management registration request and a user management instance template;
invoke the user management instance to process a service based on the user information of the first application, wherein processing the service based on the user information of the first application comprises:
receiving an access request that is of a second application, wherein the access request of the second application carries authentication information of the first application;
performing authentication according to the received authentication information; and
providing the user information of the first application for the second application after the performed authentication succeeds.

8. The user management device according to claim 7, wherein the one or more memories store the instructions for execution by the at least one processor further to:
generate the user management instance according to the user management registration request and the user management instance template; and
establish a correspondence between the identifier of the first application and the generated user management instance to obtain the user management instance of the first application.

9. The user management device according to claim 7, wherein the one or more memories store the instructions for execution by the at least one processor further to:
receive a user information access request sent by user equipment that runs the first application, wherein the user information access request carries authentication information;
perform authentication according to the received authentication information;
after performed authentication succeeds, obtain, from a user information database maintained by the user management instance, user information requested by the first application; and
return the user information that is requested by the first application.

10. The user management device according to claim 7, wherein the one or more memories store the instructions for execution la the at least one processor to:

receive a user management extension request sent by a network management device, wherein the user management extension request carries extension information, and wherein the extension information is functional information that is newly added for the first application;

establish an association between the extension information and the user information maintained by the user management instance, wherein the user management instance accesses the extension information; and send an extension success response message to the network management device.

11. The user management device according to claim 10, wherein the one or more memories store the instructions for execution by the at least one processor to:

configure authentication information of the second application for the second application; and send the authentication information of the second application to the network management device, wherein the network management device configures the authentication information of the second application for the second application, and wherein the authentication information of the second application is used when the second application accesses the user management instance.

12. The user management device according to claim 7, wherein the one or more memories store the instructions for execution by the at least one processor to:

receive registration requests sent by different user equipment for registering the first application, wherein the registration requests for registering the first application carry user information; and create a user information database and add the user information into the user information database.

* * * * *

UNITED STATES PATENT AND TRADEMARK OFFICE
CERTIFICATE OF CORRECTION

PATENT NO. : 11,388,224 B2
APPLICATION NO. : 17/209531
DATED : July 12, 2022
INVENTOR(S) : Ming Liang It is certified that error appears in the above-identified patent and that said Letters Patent is hereby corrected as shown below:

In the Specification

On Column 1 Line 9 (Approx.), Delete "Nov. 12," and insert -- Dec. 11, --.

In the Claims

On Column 22 Line 6, In Claim 6, delete "to a" and insert -- to --.

On Column 23 Line 3, In Claim 10, delete "la" and insert -- by --.

Signed and Sealed this
Twenty-second Day of November, 2022

Katherine Kelly Vidal
*Director of the United States Patent and Trademark Office*